Patented Oct. 31, 1950

2,527,962

UNITED STATES PATENT OFFICE 2,527,962

AMINO ETHERS

George Rieveschl, Jr., Grosse Pointe Woods, Mich., assignor to Parke, Davis & Company, Detroit, Mich., a corporation of Michigan No Drawing. Application October 15, 1947,
Serial No. 780,099

4 Claims. (Cl. 260—570)

This invention relates to a substituted β-dialkylaminoalkyl benzhydryl ether and its salts and to methods for obtaining the same. More particularly, the invention relates to β-dimethylaminoethyl p-methylbenzhydryl ether and its salts. The free base of the amino ether of this invention has the formula,

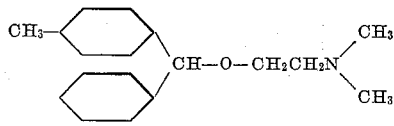

The products of the present invention may be obtained as a free base having the formula given above or as an acid addition salt of the base with inorganic or organic acids. Some examples of the salts which may be prepared by the methods hereinafter described are the hydrochloride, hydrobromide, hydroiodide, sulfate, phosphate, acetate, citrate, oxalate, succinate, tartrate, benzoate, phthalate, malate, oleate and the like.

β - Dimethylaminoethyl p - methylbenzhydryl ether can be prepared by several different processes. For example, it may be prepared by the condensation of a p-methylbenzhydryl halide with β-dimethylaminoethanol. The condensation of these two reactants may be carried out by several different methods, e. g., it may be effected in the presence or absence of an acid binding agent or with or without a solvent. Another method for preparing this compound consists in reacting an alkali metal salt of p-methylbenzhydrol with a β-dimethylaminoethyl halide or, if desired, the reactants may be interchanged and an alkali metal salt of β-dimethylaminoethanol reacted with a p-methylbenzhydryl halide. A further method of preparation consists in reacting a β-haloethyl p-methylbenzhydryl ether with dimethylamine.

The free base and the acid addition salts of β-dimethylaminoethyl p-methylbenzhydryl ether are powerful anti-histamine agent. They are also useful in preventing smooth muscle spasms induced by histamine, acetyl choline or barium chloride. Another property of these compounds is that they inhibit gastric secretion which has been induced either by meal or histamine stimulus. These new products may be administered to humans orally, parenterally, rectally or as a vapor or mist. They find particular use in humans for the treatment of allergic conditions (asthma, urticaria, histamine cephalagia and anaphylactic shock) and smooth muscle spasms (biliary spasm and dysmenorrhea).

The invention is illustrated by the following example.

Example 25 cc. of acetyl bromide is added slowly with stirring 39.7 g. of p-methylbenzhydrol dissolved in 100 cc. of benzene. After the addition has been completed the reaction mixture is refluxed for about three hours and then the benzene, excess acetyl bromide and the acetic acid which is formed distilled off under reduced pressures to obtain the desired p-methylbenzhydryl bromide.

The p-methylbenzhydryl bromide prepared above is dissolved in 25 cc. of xylene and the solution added slowly to a refluxing solution consisting of 40 cc. of β-dimethylaminoethanol in 50 cc. of xylene. After the addition has been completed the reaction mixture is refluxed for about two hours, cooled and treated with about 100 cc. of water. The layers are separated, the aqueous layer extracted once with ether and then discarded. The ether extract is combined with the organic layer, the combined extract washed with water and then extracted with several portions of 2 N hydrochloric acid (total volume about 200 cc.). The acidic extract is clarified by extracting with ether once, the ether discarded and the aqueous solution made alkaline with 40 or 50% sodium hydroxide solution. The free base of the β-dimethylaminoethyl p-methylbenzhydryl ether which separates is extracted from the aqueous solution with about 400 cc. of ether, the ether extracts washed with water and then dried over anhydrous potassium carbonate. The drying agent is removed by filtration and the filtrate made acidic to Congo red by the addition of an isopropanol solution of dry hydrogen chloride. The hydrochloride salt of β-dimethylaminoethyl p-methylbenzhydryl ether which separates is collected, washed with ether and dried in vacuo; yield about 50 g. This salt which has the formula,

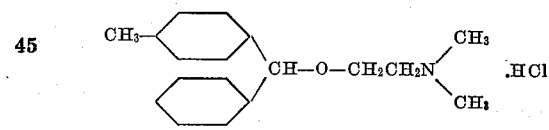

after purification by recrystallization from isopropanol-anhydrous ether mixture melts at 143.5 to 145.5° C.

If desired, the β-dimethylaminoethyl p-methylbenzhydryl ether may be isolated from the above reaction mixture as the free base rather than as the hydrochloride salt. This is accomplished by evaporating the ether from the dry ether extract containing the crude free base of β-dimethylaminoethyl p-methylbenzhydryl ether and distilling the residue under reduced pressure (about 3 to 5 mm. of Hg). The β-dimethylaminoethyl p-methylbenzhydryl ether free base thus obtained is a light yellow to colorless oily liquid.

The acid addition salts of β-dimethylaminoethyl p-methylbenzhydryl ether can be prepared either from the crude free base, as illustrated above in the case of the hydrochloride salt, or from the purified free base. When starting with the purified free base, one dissolves it in an alcohol, ether or benzene or the like and then adds the solution to, or to the solution, the acid corresponding to the desired salt. For example, the oxalate salt may be prepared as follows:

10 g. of free base of β-dimethylaminoethyl p-methylbenzhydryl ether is dissolved in a small amount of isopropanol and the resulting solution added with stirring to a warm isopropanol solution containing one equivalent of oxalic acid monohydrate. The white, crystalline acid oxalate salt of β-dimethylaminoethyl p-methylbenzhydryl ether which separates on cooling is collected and purified by recrystallization from isopropanol.

The hydrobromide salt can be prepared by dissolving 10 g. of the free base of β-dimethylaminoethyl p-methylbenzhydryl ether in anhydrous ether and treating the solution with an excess of dry gaseous hydrogen bromide. The white hydrobromide salt of β-dimethylaminoethyl p-methylbenzhydryl ether which separates from the solution is collected and purified by recrystallization from isopropanol anhydrous ether mixture.

In its broader aspects the invention includes the quaternary ammonium, as well as the acid addition, salts of β-dimethylaminoethyl p-methylbenzhydryl ether. These quaternary ammonium salts are prepared by reacting an alkyl or aralkyl halide, a dialkyl sulfate or an alkyl aryl sulfonate with the free base of β-dimethylaminoethyl p-methylbenzhydryl ether. The quaternary ammonium halides can also be prepared by the reaction of a β-haloethyl p-methylbenzhydryl ether with a dimethyl-alkyl-amine. Some specific examples of the quaternary ammonium salts which can be prepared by the foregoing methods are the methochloride, methobromide, methiodide, methosulfate, methyl p-toluene sulfonate and the benzyl chloride salts.

What I claim as my invention is:

1. A compound of the class consisting of a free base, and its acid addition salts, said free base having the formula,

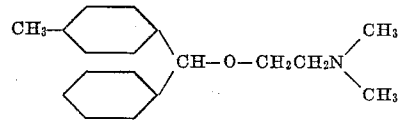

2. β-Dimethylaminoethyl p-methylbenzhydryl ether.

3. An acid addition salt of β-dimethylaminoethyl p-methylbenzhydryl ether.

4. β-Dimethylaminoethyl p-methylbenzhydryl ether hydrochloride.

GEORGE RIEVESCHL, Jr.

REFERENCES CITED

The following references are of record in the file of this patent:

UNITED STATES PATENTS

| Number | Name | Date |
| --- | --- | --- |
| 2,397,799 | Martin et al. | Apr. 2, 1946 |
| 2,421,714 | Rieveschl | June 3, 1947 |
| 2,464,260 | Rieveschl | Mar. 15, 1949 |

OTHER REFERENCES

Loew et al., "Proc. Soc. Expt. Biol. and Med.," vol. 58, March, 1945, pp. 235 to 237.

Winder et al., "J. Pharmacol," vol. 87 (1946), pp. 124 and 125.